Dec. 19, 1967  H. A. SMITH ETAL  3,358,829
SKIN PACKAGE AND METHOD OF FORMING SAME
Filed Jan. 5, 1966  2 Sheets-Sheet 1

INVENTOR
HARRY A. SMITH
EDWARD S. GALASKA
BY Fishman and VanKirk
ATTORNEYS

Dec. 19, 1967  H. A. SMITH ETAL  3,358,829
SKIN PACKAGE AND METHOD OF FORMING SAME
Filed Jan. 5, 1966  2 Sheets-Sheet 2
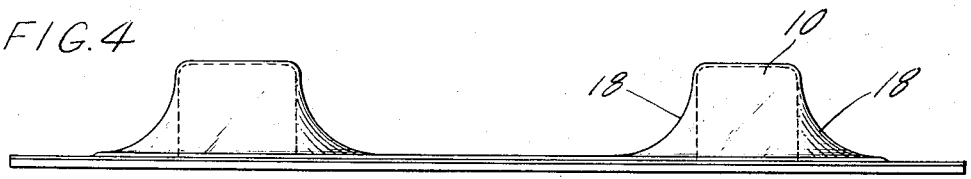
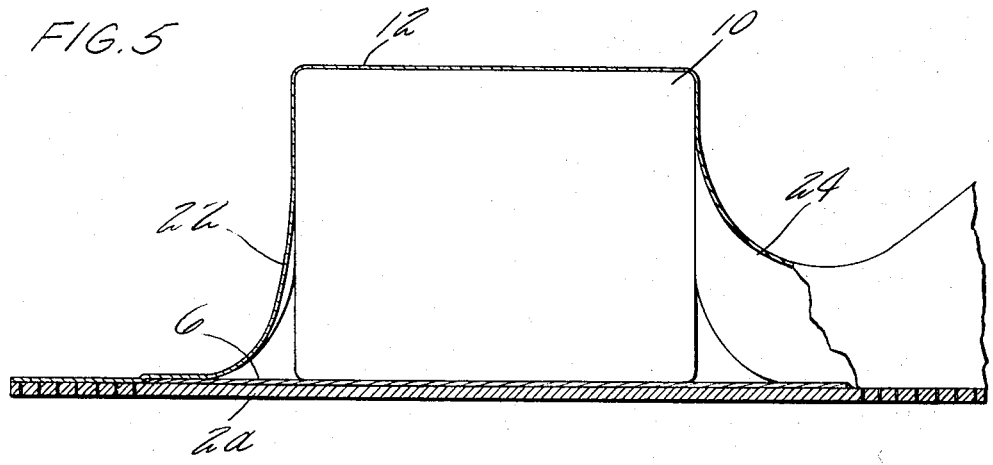
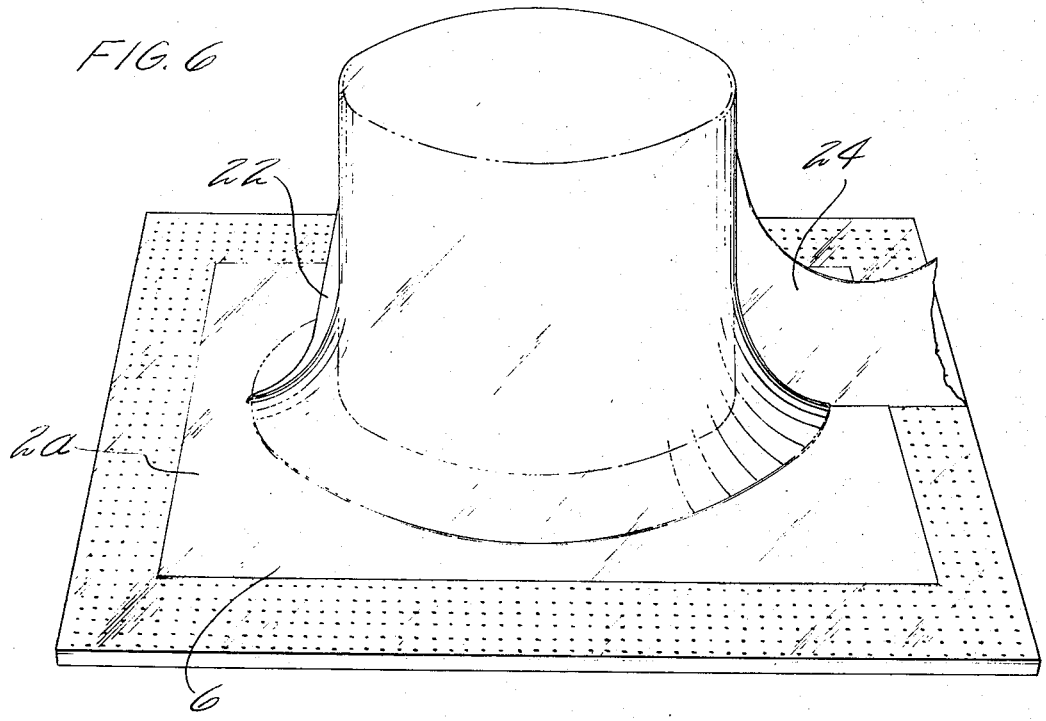

United States Patent Office 3,358,829
Patented Dec. 19, 1967

3,358,829
SKIN PACKAGE AND METHOD OF
FORMING SAME
Harry A. Smith, Middletown, and Edward S. Galaska, Hartford, Conn., assignors to Packaging Specialists, Inc., Feeding Hills, Mass., a corporation of Connecticut
Filed Jan. 5, 1966, Ser. No. 518,952
10 Claims. (Cl. 206—80)

This invention relates to skin packaging. More particularly, this invention relates to a new and improved skin package and a new and improved method of skin packaging especially suitable for packaging heavier articles than heretofore possible in skin packaging.

The general prior practice in the field of skin packaging involves placing an article to be packaged on a porous backing board base or substrate, depositing a cover sheet of thermoplastic film material over the article, and vacuum bonding the film material to the backing board. The vacuum bonding pulls the film tightly around and against the article causing the film material to stretch and thin out especially severely in the area where the article meets the backing board. As a result of this thinning out of the film material, the film material is highly susceptible to being broken by shear forces such as are generated by dropping the package on its end. Accordingly, prior skin packaging is reliable only for articles up to about fifteen pounds and only a few inches in height.

A recent development in the field of skin packaging of small, lightweight articles such as fragile electronic components involves placing a barrier sheet between the article to be packaged and the backing board. The barrier sheet diminishes the vacuum effects in the vicinity of the article so that the fragile article is not damaged during vacuum drawing of the cover sheet. Although attractive for small, lightweight articles, this technique is unsuitable for heavier articles because the barrier sheet reduces the strength of the overall package by diminishing the total area of fusing contact from the outer sheet through to the backing board.

In the present invention, a first layer of film material is bonded to the backing board between the article and the board. The cover sheet is a second layer of film material covering the article and being both bonded to the backing board and fused to the first layer of film material, except in the vicinity of the article. Rather than being pulled tight against the sides of the article, the second layer of film material forms an air pocket envelope with a fillet around the article between the first and second layers of film material.

In the absence of the first layer of film material the area of bonding between the cover sheet and the backing board would be substantially equal to the area of the backing board minus the plan area of the article, but the cover material thins where the article meets the backing board. By bonding the first layer of film material to the backing board and then bonding the cover sheet to the backing board and/or fusing to the first layer of film material, the problem of thinning of the cover sheet is avoided while the total area of bonding from the cover sheet through to the backing board is diminished only by the size of the fillet. That is, the first layer of film material is bonded to the backing board, and the cover sheet is bonded to the backing board and/or fused to the first layer of film material, depending on the size of the first layer. Thus, there is a continuous bond communication between the cover sheet and the backing board, either directly or through the first layer of film material, so that an extremely strong package is produced capable of use in skin packaging large, heavy articles, such as typewriters, for example, but not by way of limitation.

The skin packaging configuration resulting from the use of the two layers of film material with substantially full direct or indirect bonding between the cover sheet and the backing board has several advantages over previous configurations. The entire configuration is strengthened by the presence of the first layer of film material. The air pocket fillet allows for moderate movement of the packaged article in response to impact loading without breaking the upper layer of film material, and irregularly shaped articles can be packaged in this manner since the fillet is created around any shaped article. The fusion bonding of the upper layer of film material to the lower layer strengths the shear and tension characteristics of the entire package; and the thickness of the upper layer remains substantially constant, even in the area of the fillet, to improve the shear and tension characteristics of the upper layer. The previous weight and height limitations are overcome because of the high shear and tension characteristics of the present package.

Also, reinforcing ribs can be formed in the upper layer of film material to provide additional strengthening of the entire package. These reinforcing ribs are formed of double layers of the film material itself.

Accordingly, one object of the present invention is to produce a novel skin packaging configuration and method capable of handling heavier articles than heretofore practicable.

Another object of the present invention is to produce a novel skin packaging configuration and method having higher shear and tension characteristics than heretofore known.

Still another object of the present invention is to produce a novel skin packaging configuration having an air pocket fillet around the packaged article.

Still another object of the present invention is to produce a novel skin packaging configuration in which the outer layer of film material substantially retains its thickness in the vicinity of the packaged part.

Still another object of the present invention is to produce a novel method of skin packaging whereby a first layer of film material is bonded to a backing board prior to depositing a cover layer of film material over the article to be packaged and bonding the cover layer to the backing board and/or fusing to the first layer.

Still another object of the present invention is to produce a novel skin packaging configuration and method whereby reinforcing ribs are created in the cover sheet.

Other objects and advantages will be apparent from the following detailed description and drawings.

In the drawings:

FIGURE 4 is a view similar to FIGURE 2 with a different shaped article.

FIGURE 5 is a sectional view similar to FIGURE 2 with a different shaped article.

FIGURE 6 is a perspective of the package of FIGURE 5.

Figure 1:
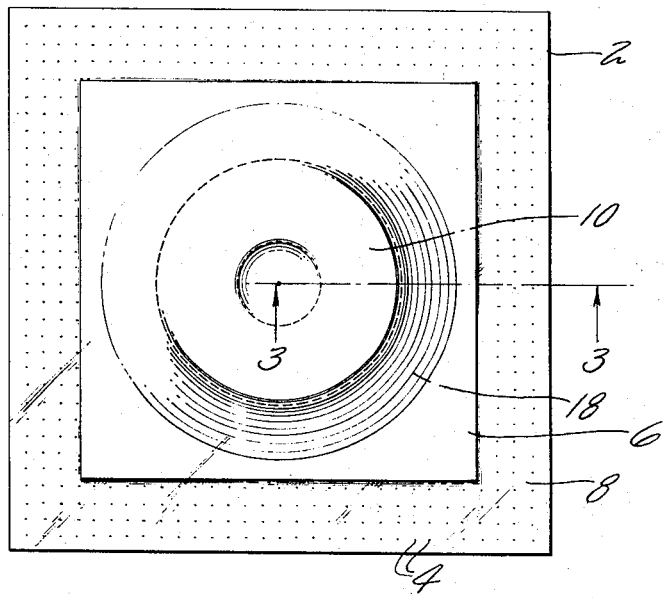
FIGURE 1 is a plan view of a thermoplastic film skin package incorporating the present invention.
Figure 2:
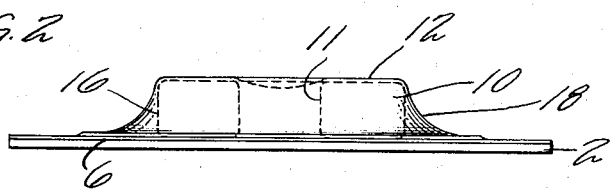
FIGURE 2 is an elevation view of the struction of FIGURE 1.

Referring now to FIGURES 1 and 2, a heavy cardboard porous backing member 2 is provided which is strong enough for the desired packaging use and through which a vacuum can be drawn. Board 2 is coated with a heat activated adhesive such as pyroxylin. As shown in FIGURE 1, board 2 is perforated by a large number of relatively small holes 4 passing through board 2 to provide the desired porosity in this embodiment. Although this invention will be described using a heavy cardboard for backing board 2, other materials, such as wood, plastic and polyethylene foam, are also suitable if sufficiently porous.

A first layer or sheet of polyethylene 6 is placed on backing board 2 to block off the holes 4 under sheet 6 while leaving a rim or border 8 of open holes around the first polyethylene layer. Any thermoplastic film materrial known in the art to be suitable for use in skin packaging may be used in place of polyethylene, such as polypropylene, polyethylene coated nylon or polyethylene coated regenerated cellulose. The film may be of any desired thickness depending on the weight and height of the article to be packaged.

An article 10 to be packaged is placed on the first layer of film material, article 10 being positioned completely within the confines of film layer 6. For purposes of illustration only, article 10 is shown as a toroidal element such as a bearing unit having a central opening 11. Next, a second sheet of heated polyethylene 12 or other suitable thermoplastic film is placed over the entire assembly of backing board 2, polyethylene sheet 6 and article 10, and a vacuum is drawn from the bottom 14 of board 2 through holes 4. Polyethylene sheet 12 is heated in any manner known in the art, as, for example, by being held in a heating frame of packaging apparatus prior to being placed over the assembly. The heat of polyethylene sheet 12 is sufficient to render sheet 12 deformable by the vacuum and is often sufficient in itself to cause a reaction from the heat activated adhesive on board 2. Additional heat may be provided to either sheet if necessary from auxiliary heating sources. The adhesive and vacuum combine to bond polyethylene sheet 6 to backing board 2 wherever sufficient heat reaches sheet 6 to activate the adhesive; the upper sheet 12 of polyethylene is similarly bonded to backing board 2 around rim 8 and is fusion bonded to sheet 6 to form a sealed package wherever it contacts sheet 6 since the heated films bond to each other. Enlarging the size of sheet 6 will result in greater area of adherence between sheets 6 and 12. The vacuum draws sheet 12 down into intimate holding contact with the top of article 10 and may cause sheet 12 to deform slightly into openings in part 10, as shown in center hole 11. However, the presence of the lower sheet 6 of polyethylene prevents the vacuum from drawing the upper sheet 12 tightly against the entire surface of the sides 16 of article 10 and along backing board 2 up to article 10 as is presently done in skin packaging. Instead, article 10 is partly encapsulated by sheet 12 and a fillet 18 is formed extending from the points of fusion of sheet 12 to sheet 6 to the article 10. The height of the fillet will vary depending on the size and shape of article 10, but the fillet will always be present around the article where the article contacts sheet 6. Fillet size can also be varied by varying several other parameters such as the degree of vacuum, geometries of sheets 6 and 12 and the amount of heat.

Figure 3:
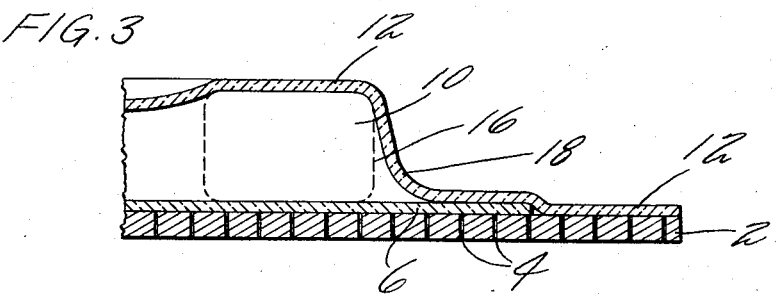
FIGURE 3 is a sectional view taken along line 3—3 of FIGURE 1.

Referring now to FIGURE 3, an enlarged cross section of part of FIGURE 1 is shown. FIGURE 3 shows in detail that film layer 6 is bonded to backing board 2, the portion of film layer 12 that is in contact with rim 8 is bonded to backing board 2 and the portion of film layer 12 in contact with film layer 6 is fusion bonded to layer 6. The drawing of the vacuum through holes 4 pulls upper sheet 12 into intimate contact along the top of article 10 to hold article 10 snugly in place, but the presence of lower sheet 6 prevents sheet 12 from being pulled completely tight along the entire sides 16 of article 10; instead, article 10 is partly encapsulated and a sealed air pocket with a fillet 18 is formed whereby film 12 slopes from the side of article 10 to fuse with sheet 6, fillet 18 defining an air pocket around article 10. The packaging could also be done in an inert atmosphere to get an inert gas in the pocket rather than air. As previously mentioned, the heat of upper film layer 12 causes the layers 6 and 12 to bond together where upper layer 12 contacts lower layer 6 in sloping towards rim 8. The structure described in FIGURES 1–3 shows a fillet extending for essentially the entire height of article 10, but as stated above, changing various parameters could shorten the height of the fillet.

The package and method of packaging described above result in a much superior skin package to those presently known. Film 12 is not stretched and pulled taut in the vicinity of the fillet, so the thickness or gauge of fillet 18 remains essentially the same as the thickness of the rest of sheet 12. Also, there is continuous bonding of surfaces throughout the package wherein lower sheet 6 is bonded to backing board 2 and upper sheet 12 is bonded both to backing board 2 wherever it contacts backing board 2 and fused to sheet 6 wherever it contacts sheet 6. Thus, the shear and tension characteristics of the package are significantly increased over previous packages in which either the cover film was stretched and thinned out at the junction of the article to be packaged and the backing board or the continuous bonding of surfaces was absent. Also, fillet 18 and the overall strength of the bond between all layers allow for slight movement of article 10 in response to shock impact loading of the package without rupturing film 12 and without shearing any layer.

Although the foregoing explanation stated that the sheets of film material 6 and 12 were both heated and bonded to backing board 2 simultaneously, it will be apparent that the bonding of these sheets could be accomplished in separate steps. Also, the sheets of film material could be treated for bonding to the board rather than the board being treated.

Another possible alternative includes an arrangement such as shown in FIGURES 5 and 6 where part of backing board 2 is nonperforated, for example the center part, and lower sheet 6 is bonded to the nonperforated part by vacuum bonding if a satisfactory vacuum can be drawn through nonperforated part 2a or by pressure bonding or any other suitable method. Upper sheet 12 would still be fusion bonded to sheet 6 to provide the communication of bonding between the backing member, the lower sheet and the upper sheet.

As shown in FIGURE 4, article 10 is a ring having a wide center opening. In this embodiment upper sheet 12 would also fuse to sheet 6 in the center of the ring, and fillet 18 would be created on both sides of the ring.

Referring now to FIGURE 5, article 10 is shown as a relatively tall cylinder. This embodiment shows a fillet that extends for only part of the height of the article.

The FIGURE 5 structure also shows reinforcing ribs 22 and 24 which serve to further strengthen the package. These ribs are formed by allowing an extension of heated sheet 12 to contact a body outboard of backing member 2 to cause a web to be formed of a double layer of thickness of sheet 12 between article 10 and the outboard body. The extension of sheet 12 is then cut off leaving the rib as part of the package. As illustrated by the different ribs 22 and 24, the ribs can be made to be of different heights by varying the height of the outboard body. FIGURE 6 shows the package of FIGURE 5 in perspective showing two illustrative ribs.

Figure 7:
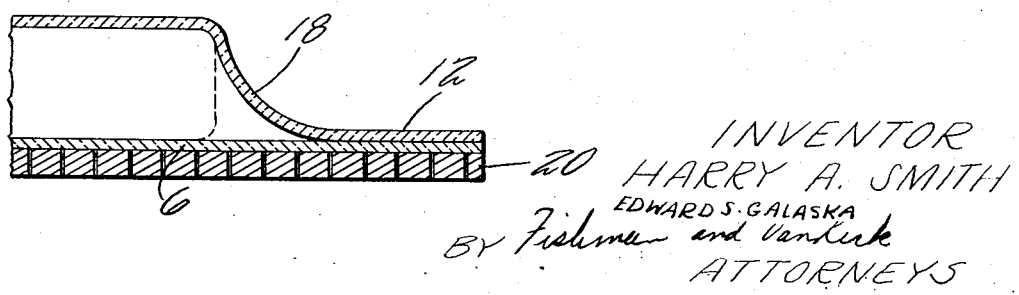
FIGURE 7 is a sectional view similar to FIGURE 3 showing an alternative structure.

Referring now to FIGURE 7, an alternative arrangement is shown. The structure of FIGURE 7 differs from the FIGURE 1 structure only in that lower sheet 6 extends to the edge of board 2 thus eliminating the rim or border 8 of the FIGURE 1 configuration. The FIGURE 7 configuration can be constructed by either of two methods. In one method, sheet 6 is heated and bonded to adhesive treated board 2 by the drawing of the vacuum; article 10 is then placed on sheet 6; and a heated sheet 12 is placed over the assembly. A vacuum is then pulled around the edges 20 of sheet 2 to fusion bond sheet 12 to sheet 6. In the second method, lower sheet 6 is not bonded to backing plate 2 until heated upper sheet 12 is placed on the assembly and the vacuum is drawn. In this second method sheet 6 is bonded to adhesive treated board 2 at the same time that sheet 12 is fusion bonded to sheet 6. In either method, the desired fillet 18 is produced.

It will also be apparent that whenever it is desired to employ perforations in backing board 2, it will be sufficient for the perforation to pass through the adhesive coating on the upper surface of backing board 2. The porosity of the board itself will allow for the drawing of a vacuum once the adhesive coating has been perforated.

It is to be expressly understood that while preferred embodiments have been shown and described, the present invention has been disclosed by way of illustration and not limitation.

We claim:

1. A package for an article comprising an air permeable backing member, a first layer of fluid impervious film material bonded to at least part of said backing member, said article being in contact with said first layer of film material on the side of said first layer of film material removed from said backing member, and a second layer of fluid impervious film material overlying said article and conforming to the shape of at least the upper part of said article to thereby partly encapsulate said article, said first and second layers of film material being of the same material, part of said second layer of film material being heat fusion bonded to part of said first layer of film material to provide continuous bonding communication between said backing member, said first layer of film material and said second layer of film material, and said second layer of film material flaring outwardly from said upper part of said article and cooperating with said first layer of film material to form a fillet around the base of said article.

2. A package for an article as in claim 1 including at least one reinforcing rib, said reinforcing rib being formed of said second layer of film material and extending from a region of continuous communication between said first and second layers of film material and backing member into the region where said second layer of film material conforms to the shape of said article.

3. A package for an article comprising an air permeable backing member, a first layer of thermoplastic film material, at least part of said first layer of film material being vacuum bonded to said backing member, said first layer of film material covering only a part of said backing member and being surrounded by a rim of said backing member, said article being in contact with said first layer of film material on the side thereof removed from said backing member, and a second layer of thermoplastic film material overlying said article and said backing member and conforming to the shape of at least the upper part of said article to thereby partly encapsulate said article, said second layer of film material being vacuum bonded to said rim of said backing member and being heat fused to said first layer of film material at points of contact therebetween to provide continuous bonding communication between said backing member, said first layer of film material and said second layer of film material, said second layer of film material flaring outwardly from said upper part of said article and cooperating with said first layer of film material to form a fillet around the base of said article.

4. A package for an article as in claim 3 wherein said first and second layers of film material are of the same material and wherein the thickness of said second layer of film material in said fillet is substantially equal to the thickness of the remaining part of said second layer of film material.

5. A package for an article as in claim 3 wherein said backing member is coated with a heat responsive adhesive and wherein said rim is perforated and the area of said backing board under said first layer of film material is nonperforated.

6. A package for an article as in claim 3 including at least one reinforcing rib, said reinforcing rib being formed of said second layer of film material.

7. The method of skin packaging an article on a backing member comprising the steps of:
placing a first layer of film material on said backing member,
placing the article to be packaged on said first layer of film material on the side thereof removed from said backing member,
placing a second layer of film material over the article to be packaged and said first layer of film material,
vacuum bonding at least part of said first layer of film material to said backing member,
vacuum bonding part of said second layer of film material to said backing member, and
fusion bonding said second layer of film material to said first layer of film material at the points of contact therebetween to provide continuous bonding communication between said backing member, said first layer of film material and said second layer of film material and to form an envelope partly encapsulating the article and conforming to the shape of at least the upper part of the article and having a fillet of said second layer of film material around the base of the article to be packaged.

8. The method of skin packaging as in claim 7, including the step of forming at least one reinforcing rib in said second layer of film material, said reinforcing rib being formed of said second layer of film material.

9. A method of skin packaging an article on a backing member comprising the steps of:
placing a first layer of film material on said backing member,
placing the article to be packaged on said first layer of film material on the side thereof removed from said backing member,
placing a second layer of film material over the article to be packaged and said first layer of film material,
vacuum bonding at least part of said first layer of film material to said backing member, and
fusion bonding part of said second layer of film material to said first layer of film material at the points of contact therebetween to provide continuous bonding communication between said backing member, said first layer of film material and said second layer of film material and to form an envelope partly encapsulating the article and conforming to the shape of at least the upper part of the article and having a fillet of said second layer of film material around the base of the article to be packaged.

10. The method of skin packaging as in claim 9 including the step of forming at least one reinforcing rib in said second layer of film material, said reinforcing rib being formed of said second layer of film material.

References Cited
UNITED STATES PATENTS 3,202,278  8/1965  Taylor _____ 206—80

JOSEPH R. LECLAIR, Primary Examiner.

THERON E. CONDON, LOUIS G. MANCENE, Examiners.

J. M. CASKIE, Assistant Examiner.